Feb. 27, 1951  S. P. ERWIN  2,543,279
NUT DRIER
Filed Jan. 31, 1947  2 Sheets-Sheet 1

INVENTOR
S. P. Erwin
BY Webster & Webster
ATTORNEYS

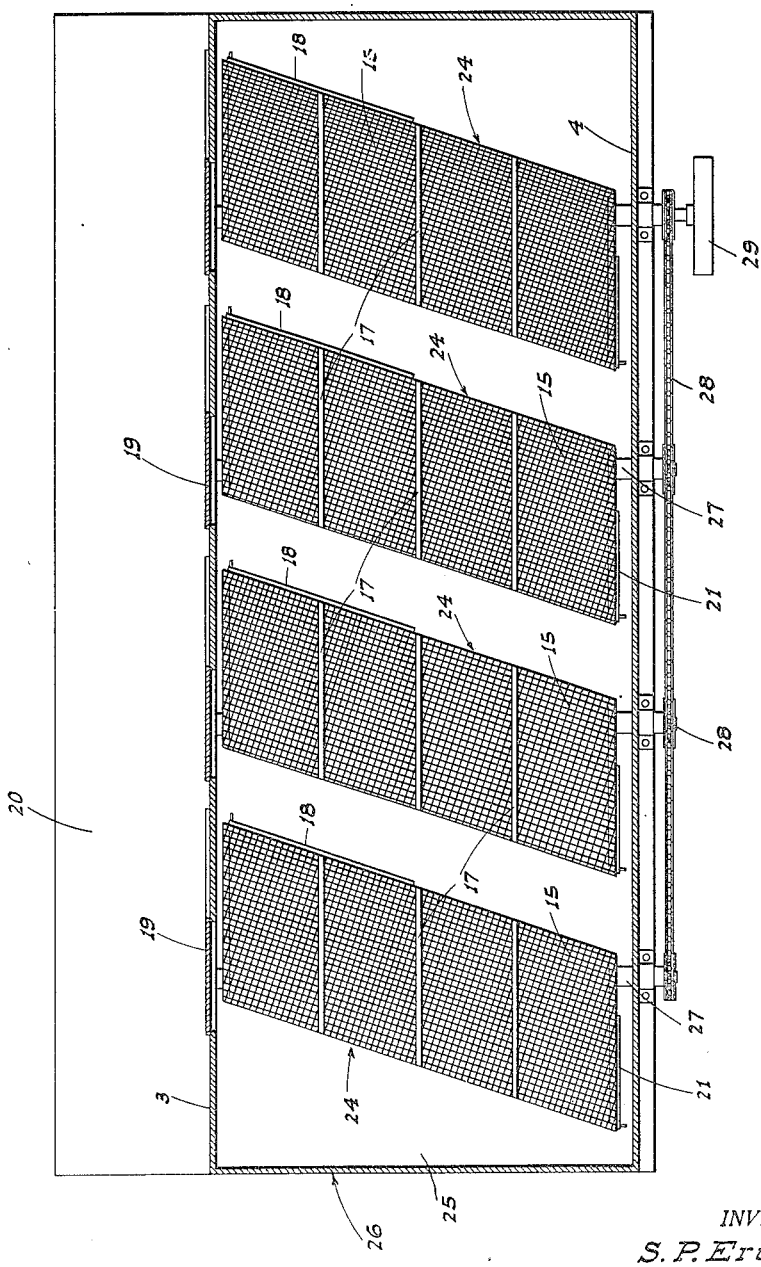

Patented Feb. 27, 1951

2,543,279

UNITED STATES PATENT OFFICE 2,543,279

NUT DRIER

Samuel P. Erwin, Santa Rosa, Calif.

Application January 31, 1947, Serial No. 725,637

1 Claim. (Cl. 259—3)

This invention is directed to, and it is an object to provide, a novel apparatus for drying nuts, such as walnuts, preparatory to marketing the same.

Another object of the invention is to provide a nut drier which comprises a structure forming a drying chamber, and a rotary drying box or tumbler mounted in said chamber and adapted to receive a quantity of nuts for drying; said rotary drying box being perforate in part to permit of hot air circulation through the nuts in the box.

An additional object of the invention is to provide nut drying apparatus, as in the preceding paragraph, in which said rotary drying box is elongated and mounted lengthwise on, but in diagonal relation to, a horizontal supporting and drive shaft in the drying chamber; the diagonal relationship of the box to the shaft assuring of effective rolling or tumbling of the nuts, as is desirable, upon rotation of the shaft and box assembly.

A further object of the invention is to provide a novel door assembly for loading and unloading the rotary drying box.

A further object of the invention is to provide a practical nut drier, and one which will be exceedingly effective for the purpose for which it is designed.

These objects are accomplished by means of such structure and relative arrangement of parts as will fully appear by a perusal of the following specification and claim.

In the drawings:

Fig. 3 is a sectional plan of the nut drier as embodying a plurality of the rotary drying boxes or tumblers mounted within a common drying chamber.

Figure 1:
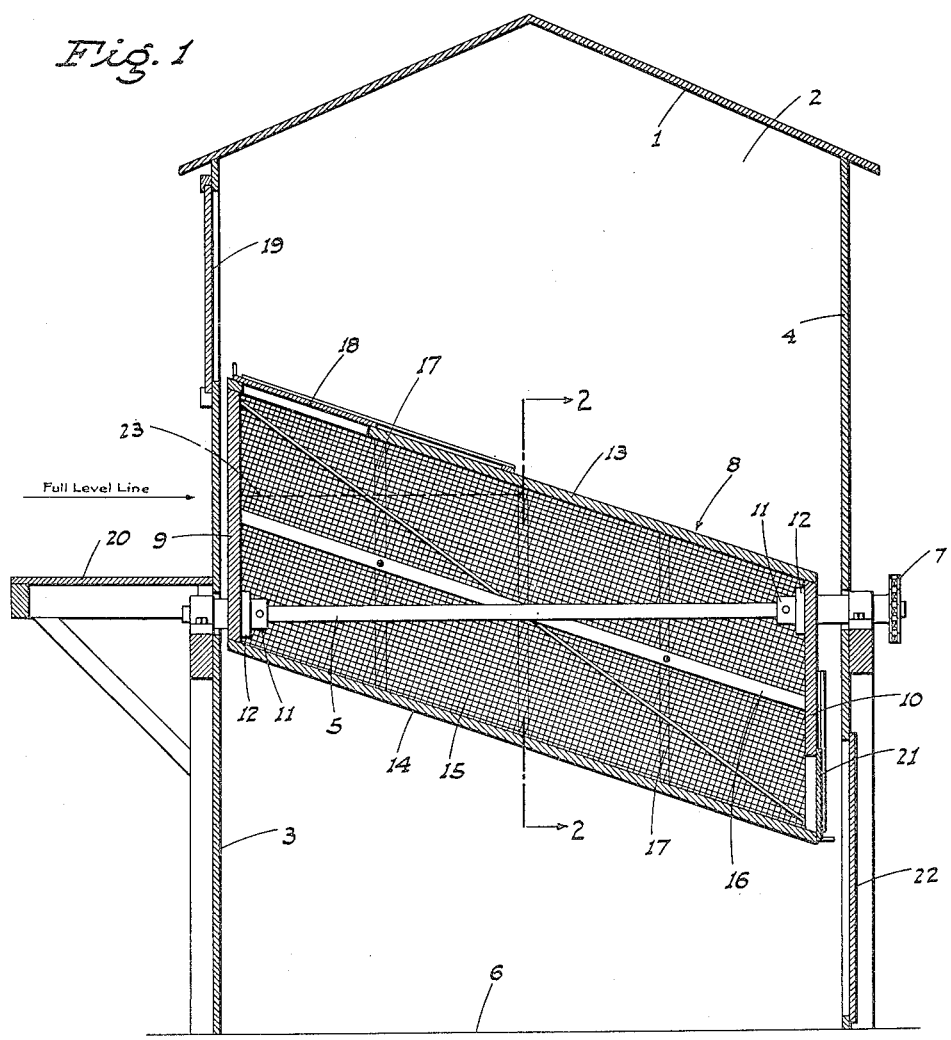
Fig. 1 is a sectional elevation of the improved nut drier.
Figure 2:
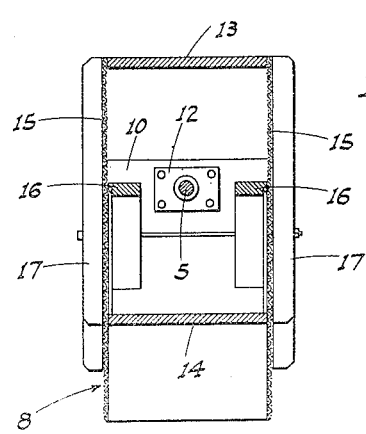
Fig. 2 is a cross section on line 2—2 of Fig. 1.

Referring now more particularly to the characters of reference on the drawings, and particularly at present to Figs. 1 and 2, the improved nut drier comprises an upstanding housing structure 1 which forms an enclosed drying chamber 2; said structure including opposed walls, indicated at 3 and 4.

A driven horizontal shaft 5 extends across the drying chamber 2 between, and is journaled in connection with, the walls 3 and 4, some distance above the floor 6. The shaft 5 is driven by an endless chain and sprocket unit, indicated generally at 7.

Within the drying chamber 2, the shaft 5 is surrounded, for substantially its full length, by an elongated drying box, indicated generally at 8; the shaft 5 extending through the box between the ends thereof in diagonal relationship to said box, the latter being constructed and mounted as follows:

The elongated drying box 8 comprises a pair of solid, rectangular ends 9 and 10, which are fixed to the shaft 5 adjacent the ends thereof and project in opposite directions. The ends 9 and 10 are fixed to the shaft 5 by collars 11 mounted on the shaft and carrying attachment plates 12 secured on said ends 9 and 10.

A non-perforate top 13 and a non-perforate bottom 14, disposed in parallel relationship, connect between the ends 9 and 10 in diagonal relation to the shaft 5; i. e. the top 13 converges toward the shaft 5 in the direction of the wall 4, while the bottom 14 diverges in such direction relative to the shaft.

Opposite sides of the box 8 are closed by perforate or screen sides 15 in the shape of a parallelogram; said screen sides being reinforced from the inside by longitudinal braces 16 and from the outside by spaced cross braces 17.

The non-perforate top 13 is provided, at the end adjacent the wall 3, with a normally closed slide gate 18, through which the drying box is adapted to be loaded when said gate is uppermost. At a point above the gate 18, when it is in its uppermost position, the wall 3 is formed with a normally closed access door 19 above an outside loading platform 20.

The end 10 is formed with a normally closed slide gate 21 in the lower portion of said end 10 when in position depending from the shaft 5; the wall 4 having a normally closed access door 22 adjacent and extending below the down position of the slide gate 21.

The above described nut drying apparatus is used in the following manner:

At the outset, the drying box 8 is disposed in the position shown in Fig. 1, and the door 19 and gate 18 are open, whereupon nuts to be dried may be loaded from platform 20 directly into the drying box. The box is filled to a level no greater than the fill level line, indicated at 23 in Fig. 1. With the box 8 so loaded, the gate 18 and door 19 are closed.

The housing structure 1 is provided with mechanism (not shown) whereby heated air is circulated in the drying chamber 2, and the elongated drying box 8 is rotated in the chamber 2 by means of the shaft 3, whereby to impart a tumbling action to the nuts in said box to facilitate and expedite the drying of the nuts.

By reason of the particular configuration of the elongated drying box 8 with the shaft 5 extending diagonally therethrough, the nuts in the box, upon each revolution thereof, not only are tumbled, but are shifted to and fro longitudinally of the box; producing a very effective agitating or stirring of the nuts, which assures of maximum heat exchange therethrough. In actual practice, the box 8 is alternately rotated, and then permitted to remain stationary, for predetermined periods of time so that excessive tumbling of the nuts is avoided.

When a load of nuts in the box 8 has been adequately dried, the box 8 is stopped with the slide gate 21 in its lowermost position, whereupon the access door, and then said gate 21, are opened, permitting the dried nuts to spill, by gravity from the box 8, into a suitable receiver.

While the above description deals with the structure and operation of a single drying box 8, said boxes may be mounted in multiple, as shown in Fig. 3. Here, the elongated drying boxes, as indicated generally at 24, are each mounted side by side in the drying chamber 25 of a housing structure 26. The horizontal shafts 27 of the boxes 24 are connected, in common driven relationship, to an endless chain and sprocket unit 28, which may be driven in any suitable manner, as by a pulley 29. When used in multiple, as in Fig. 3, each drying box 24 is loaded and unloaded in exactly the same manner as described in connection with the box shown in Fig. 1.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful, and upon which Letters Patent are desired:

In a nut drying apparatus which includes a drying chamber having vertical side walls, a horizontal driven shaft extending across the chamber at right angles to the side walls, an elongated nut receiving drying tumbler mounted on the shaft, said tumbler being perforated in part and including a longitudinal wall and vertical end walls disposed relatively close to the corresponding side walls of the chamber, the shaft extending from adjacent one edge of one end wall to adjacent the opposite edge of the opposed end wall, a normally closed nut intake gate in said longitudinal wall at the end thereof which is furthest from the shaft at the corresponding end wall and a normally closed gate in the opposite end wall disposed so as to be at the lower end thereof when said longitudinal wall and intake gate therein are in an uppermost position; the side walls of the chamber having openings therein arranged so that when said longitudinal wall is in an uppermost position the gate therein cooperates with the opening in the adjacent chamber wall and at the same time the gate in said opposite end wall cooperates with the opening in the opposite chamber wall.

SAMUEL P. ERWIN.

REFERENCES CITED

The following references are of record in the file of this patent:

UNITED STATES PATENTS

| Number | Name | Date |
|---|---|---|
| 174,741 | Rhodes | Mar. 14, 1876 |
| 189,389 | Sands | Apr. 10, 1877 |
| 208,849 | Reuter | Oct. 8, 1878 |
| 317,348 | Harris | May 5, 1885 |
| 726,279 | Giacomini | Apr. 28, 1903 |
| 854,258 | Weber | May 21, 1907 |
| 994,246 | Churchill | June 6, 1911 |
| 1,080,629 | Griswold et al. | Dec. 9, 1913 |
| 1,520,448 | Smith | Dec. 23, 1924 |
| 1,780,047 | Tan | Oct. 28, 1930 |
| 2,148,057 | Chamberlain | Feb. 21, 1939 |